(12) United States Patent
Ries et al.

(10) Patent No.: US 7,287,227 B2
(45) Date of Patent: Oct. 23, 2007

(54) SYSTEM AND METHOD FOR EDITING WEB PAGES IN A CLIENT/SERVER ARCHITECTURE

(75) Inventors: David E. Ries, New York, NY (US);
James A. Curran, New York, NY (US)

(73) Assignee: VE Enterprises LLC, New York, NY (US)

( * ) Notice: Subject to any disclaimer, the term of this patent is extended or adjusted under 35 U.S.C. 154(b) by 455 days.

(21) Appl. No.: 10/186,541

(22) Filed: Jul. 1, 2002

(65) Prior Publication Data

US 2003/0023632 A1 Jan. 30, 2003
US 2004/0217985 A9 Nov. 4, 2004

Related U.S. Application Data

(60) Provisional application No. 60/302,145, filed on Jun. 29, 2001.

(51) Int. Cl.
*G06F 17/00* (2006.01)

(52) U.S. Cl. .................. 715/741; 715/742; 715/743; 715/744; 715/501.1

(58) Field of Classification Search ............... 715/526, 715/501.1, 513, 530, 540, 512, 749, 760, 715/748, 741–744; 709/227, 219
See application file for complete search history.

(56) References Cited

U.S. PATENT DOCUMENTS

| | | | |
|---|---|---|---|
| 5,793,966 A | 8/1998 | Amstein et al. | |
| 5,802,299 A | 9/1998 | Logan et al. | |
| 5,845,299 A * | 12/1998 | Arora et al. | 715/513 |
| 5,884,301 A | 3/1999 | Takano | |
| 5,911,145 A | 6/1999 | Arora et al. | |
| 5,956,709 A | 9/1999 | Xue | |
| 5,991,760 A | 11/1999 | Gauvin et al. | |
| 6,043,815 A | 3/2000 | Simonoff et al. | |
| 6,044,372 A | 3/2000 | Rothfus et al. | |
| 6,052,710 A | 4/2000 | Saliba et al. | |
| 6,061,692 A | 5/2000 | Thomas et al. | |
| 6,101,510 A | 8/2000 | Stone et al. | |
| 6,151,609 A * | 11/2000 | Truong | 715/505 |
| 6,175,832 B1 | 1/2001 | Luzzi et al. | |
| 6,185,587 B1 | 2/2001 | Bernardo et al. | |
| 6,188,401 B1 | 2/2001 | Peyer | |
| 6,191,786 B1 | 2/2001 | Eyzaguirre et al. | |
| 6,199,166 B1 | 3/2001 | Lanzy et al. | |
| 6,212,533 B1 | 4/2001 | Tabuchi | |
| 6,253,254 B1 | 6/2001 | Erlenkoetter et al. | |
| 6,278,449 B1 * | 8/2001 | Sugiarto et al. | 715/826 |
| 6,292,185 B1 | 9/2001 | Ko et al. | |

(Continued)

*Primary Examiner*—Tadesse Hailu
(74) *Attorney, Agent, or Firm*—Frank J. DeRosa; Frommer Lawrence & Haug, LLP

(57) ABSTRACT

A method for the editing of web pages by selectively providing editing logic and data that associates portions of the page with data sources used to provide the portions. Identical pages are provided to both editors and non-editors, preferably by retrieving and viewing the page in a browser. The editor can use the editing logic to edit the displayed page. The invention uses the associating data in order to update data sources used to provide the web page in accordance with the edits. The use of associating data by the invention supports functionality that allows for updating of a wide variety of data sources with potentially complex relations to the provided web page.

34 Claims, 11 Drawing Sheets

U.S. PATENT DOCUMENTS

| | | |
|---|---|---|
| 6,304,886 B1 | 10/2001 | Bernardo et al. |
| 6,308,188 B1 | 10/2001 | Bernardo et al. |
| 6,336,115 B1 | 1/2002 | Tominaga et al. |
| 6,336,123 B2 | 1/2002 | Inoue et al. |
| 6,546,397 B1 * | 4/2003 | Rempell .................. 707/102 |
| 6,578,078 B1 * | 6/2003 | Smith et al. ............... 709/224 |
| 6,625,803 B1 * | 9/2003 | Massena et al. ............ 717/100 |
| 6,631,512 B1 * | 10/2003 | Onyeabor .................. 717/100 |
| 6,822,663 B2 * | 11/2004 | Wang et al. ............... 715/854 |
| 6,854,087 B1 * | 2/2005 | Takeo et al. ............... 715/526 |
| 2001/0001555 A1 | 5/2001 | Bricklin et al. |
| 2001/0020244 A1 | 9/2001 | Belanger et al. |
| 2001/0032220 A1 | 10/2001 | Ven Hoff |
| 2001/0042045 A1 | 11/2001 | Howard et al. |
| 2001/0050681 A1 | 12/2001 | Keys et al. |
| 2002/0004755 A1 | 1/2002 | Balthaser |
| 2002/0073125 A1 * | 6/2002 | Bier .......................... 707/530 |

* cited by examiner

SYSTEM AND METHOD FOR EDITING WEB PAGES IN A CLIENT/SERVER ARCHITECTURE

Applicant hereby claims the benefit of provisional application No. 60/302,145, filed Jun. 29, 2001, which application is hereby incorporated by reference in its entirety into this application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to editing electronic documents and other data. More particularly, this invention relates to systems and methods for editing data provided by web sites or the like on a computer network.

BACKGROUND OF THE INVENTION

In recent times, the Internet has gained universal acceptance. A global network connecting millions of computers, the Internet is now the "ultimate" place for interaction between providers and consumers of information based services. Currently, an estimated 560 million people are online (roughly 9% of the world population) and roughly 147 million web sites are provided on the Internet.

Consuming is extremely easy: with an Internet connection and a freely available browser, even novice consumers can interact with provider web sites. Providing web sites, on the other hand, requires specialized skills. Individuals typically use a class of tools known as desktop authoring tools, such as Microsoft FrontPage™ and Macromedia DreamWeaver™, or another class of tools known as remote authoring tools, such as Trellix Web Express™ and Yahoo Store™. Businesses typically hire professional web site companies or developers.

Provider's sites vary in technical complexity. Simpler sites, generally known as static sites, comprise a set of associated files such as image files and text files that contain HTML formatted text. These files are provided "as is" in the form of a web page when requested by a consumer. More complicated sites, generally known as dynamic sites, utilize processes on the server to alter, create, or aggregate files and often non-file data such as that in databases. The results of these processes are sent in the form of a web page when requested by the consumers. In typical dynamic sites, no one file on the server contains the web page.

During the web site creation process, providers' site creators design and engineer the site architecture: navigation, branding, layout, client script and, for dynamic sites, the server-side processes. Typically, once the creation process is complete, providers infrequently change these architectural elements. Frequent changes to the site are often necessary, but these are changes to text, images, links and other "content" contained within the architecture. These content edits are typically driven by daily business needs and, because they do not change the site architecture, would not generally require specialized skills. Typically, however, because the content is intermingled with the architecture, it is necessary to use specialized skills or tools.

Two current content editing paradigms are referred to as desktop authoring tools and remote authoring tools.

Desktop authoring tools, such as Microsoft FrontPage™ and Macromedia DreamWeaver™, typically allow an author to: 1) create a new file or retrieve a copy of a file from the server via FTP; 2) edit the file contents; and then 3) transfer the file via FTP to the server, replacing an existing file with the edited file if appropriate. They assist in the editing process with many specialized tools and interfaces for creating HTML and script and for previewing the files locally. Some of these tools offer a WYSIWYG (What You See is What You Get) interface which assists authors with the technical difficulties involved in the editing process by allowing them to edit in a word-processing-like style: authors type and use toolbars to edit rendered web pages, while the WYSIWYG-enabled tool rapidly creates the HTML and re-renders it.

In order for the client to retrieve and update files, using current desktop authoring tools, the server must allow the client read/write access to the server file system. This creates security, privacy, and corruption issues.

Because current desktop authoring tools retrieve, edit, and update entire files, restricting edits to content portions of files is often a difficult task: for example a content editor cannot easily be restricted from editing architectural elements of files that contain intermingled content and architecture. This exposes the site to corruption during each editing session.

Editing dynamic sites using current desktop authoring tool is also difficult. Editors may need to trace the origin of the web page content from several files. Additionally, they must understand the scripting languages and the interaction they dictate between the HTML that they control and other files, processes, and data in order to change the resulting web page. Typically, server-side processing cannot be executed on the client machine and it is impossible to preview edits. Additionally, desktop authoring tools cannot access or edit non-file data sources which are common on dynamic sites.

Remote authoring tools provide an alternative content authoring paradigm to desktop authoring tools. Remote authoring tools typically take one of three general forms: pre-made form-based administration tools such as Trellix Web Express™ and Yahoo Store™; custom made form-based administration tools; or content management systems such as VIGNETTE™ or INTERWOVEN TEAMSITE™.

Typically, remote authoring tools comprise a password restricted web site on the same server as the web site to be edited. The tool contains areas corresponding to all anticipated editing needs of authors. Authors log in to the tool and navigate to an appropriate form. For example, a form to change the title of an article on a web site article list may comprise a text input box labeled "Article Title" and an associated submit control labeled "Update Title". The form is submitted to the server where server-side scripts process it and execute the edits.

Current remote authoring tools require editors to make edits to the web site from within an interface which is not the web site. Typically, in order to change a web page visible in the browser, an editor must leave the page, enter the remote authoring tool, select and complete the correct task forms, and then return to the web page to view the changes. Some content management solutions allow editors to edit within what appears to be the web site as provided to consumers, but this is accomplished only by deep embedding in that process, as mentioned below.

Remote authoring tools advantageously prevent clients from accessing the server file system. Also, because remote authoring tools reside centrally on the server, they can edit and process dynamic site components, set user and group level permissions, and implement other features involving multiple clients.

However, current remote authoring tools either require great resources to implement or impose great limitations on the architecture of the web site they administer.

Pre-made administration tools require providers to create or alter their site to fit the tool. Typically this means creating the site within the tool's template-based site-building component, and may be impractical for providers with existing sites.

Custom administration tools are built to support a specific web site and often take as much time and more technical skill to build and modify as the web sites that they are designed to administer.

Content management systems are more flexible than pre-made administration tools without requiring the build efforts of custom administration tools. They require providers to build their site within a complex but flexible system and/or deeply embed the tool within the site. In addition to the time and technology required to implement and support these complex tools, they typically require providers to integrate the tool into the processes used to provide the web site.

BRIEF SUMMARY OF THE INVENTION

The invention provides for client side editing of structured documents, e.g., web pages, provided by one or more servers, e.g., web servers, and server side modification of data used by the one or more servers to provide the structured documents in accordance with the client side editing. Clients display the structured documents using viewing software or viewers, e.g., for web pages, a browser, and edit the displayed documents using logic (or software) provided by the invention. The invention also provides data associating an editable portion or portions of web pages displayed by the clients with data that is used by the one or more servers to provide the web pages.

The viewing software may be software for displaying structured documents available independently of the invention, for example for use with web pages, a browser such as MS Internet Explorer, or in the case of other structured documents, other currently available viewing software. This viewing software is used by clients to display structured documents that are editable in accordance with the invention, as well as structured documents that can only be displayed by the clients because those clients do not have the inventive editing logic or are not authorized to use it.

In accordance with the invention, the same editable structured documents can be supplied to all clients, and displayed the same by all clients. However, only clients with the inventive editing logic can edit the displayed documents. Thus, structured documents including the associating data are displayed the same by a client having the editing logic, either while editing or simply displaying the structured documents, and by clients without the editing logic which simply display the structured documents, i.e., the existence of associating data in a displayed structured document is transparent unless the document is being edited.

The invention provides methods, systems and software for client side editing of structured documents as described herein. One method performed in accordance with the invention edits structured documents provided by a server to clients having viewing software for displaying the structured documents. This method comprises: providing a structured document; providing data that associates at least one portion of the structured document not comprising the entire structured document with data used by the server to provide the structured document; at a client having structured document editing logic and the structured document, using the viewing software, user input and editing logic, displaying and editing the structured document; at a client provided with the structured document and not having the structured document editing logic, displaying the structured document using the viewing software; and using the data that associates at least one portion of the structured document with data used by the server, modifying the data used by the server in accordance with the editing of the structured document performed by the client having editing logic.

Editing logic may be provided that is executed by the client's viewing software, or independently thereof.

The same server may be used to provide the structured document, the associated data and the editing logic, and to modify the data stored in the at least one data store in accordance with the editing of the structured document, or different servers may be used to provide all or some of that functionality.

An embodiment of a system provided by the invention displays structured documents in a client/server computer system that includes a plurality of clients each having viewing software for displaying the structured documents and at least one server for providing structured documents to clients. The inventive system comprises: data that associates data in at least one portion of the structured document not comprising the entire structured document with data used by the at least one server to provide the structured document; editing logic; and software for modifying the data used by the at least one server to provide the structured document in accordance with the editing of the structured document performed by a client having editing logic. As discussed above, clients with the editing logic edit structured documents displayed by the viewing software in response to user input.

The system may include more that one server provided as discussed above, and the viewing software may execute the editing logic as discussed above.

The invention further provides a computer program embodied on a computer-readable medium or media for editing structured documents provided by a server to clients having viewing software for displaying the structured documents, that includes data, logic and software as described above.

As mentioned above, editing logic may be selectively provided to clients, and clients having editing logic may not be authorized to edit a particular document or to edit at all. The invention may also determine whether a client has authorization to edit the structured document displayed by that client, and if so, providing the editing logic or permitting the client to edit the structured document, or particular document, only if the client has authorization. Authorization for accomplishing the foregoing may be provided to the clients in the editing logic, or separately, by the server or other sources. Software and techniques for authorizing clients to perform a particular function or to access a particular document or function are known to those skilled in the art.

The structured documents may be provided as a result of accessing, processing and/or aggregating data from at least one data store.

Other embodiments of the invention contemplate a method for editing web pages provided by a web server to clients having browser software the comprises providing a web page to clients, providing data that associates at least one portion of the web page not comprising the entire web page with data stored in at least one of one or more files comprising logic processed by the server, one or more non-file data stores, and more than one file used by the web server to provide the web page and selectively providing web page editing logic to clients. At a client provided with the web page editing logic and the web page, the method contemplates using the browser software, user input, and the editing logic, to display and edit the web page. At a client provided with the web page and not having the web page editing logic, the web page is displayed using the browser software. Using the data that associates at least one portion of the web page not comprising the entire web page with stored data, the stored data is modified in accordance with the editing of the web page performed by the client provided with the editing logic. Alternatively, providing the web page may comprise a web page whose complete content is not stored as a complete file or a web page that does not comprise data added for the purpose of encapsulating or describing editable data within the web page.

The present invention also comprises a method for editing web pages provided by a web server to clients having browser software that comprises parsing the web page to identify at least one editable portion of the web page comprising at least one of two HTML tags and at least one HTML tag with one string of text not contained as part of the at least one HTML tag presenting the contents of the at least one editable portion of the web page to a user in an editable format, and receiving as input edits to the at least one editable portion of the web page.

An alternative embodiment of the invention comprises parsing the web page to identify at least one editable portion of the web page, presenting the contents of the at least one editable portion of the web page to a user in a WYSIWYG editable format, and receiving as input edits to the at least one editable portion of the web page. The method may alternatively comprise providing, in addition to the editable portion of the web page, data to identify at least one of a type of editable portion identified, rules pertaining to the editing of the editable portion, and data sources used by the web server to provide the editable portion of the web page. Furthermore, the method may instead or additionally comprise providing additional data relating to at least one of one or more data stores relating to the web page and rules relating to the editing of the web page and providing GUI elements to present predefined options to create or modify one or more of the at least one editable portion of the web page.

The following describes various embodiments of data provided or used in accordance with the invention. The data stored in the at least one data store may include data stored in one or more of the following: one or more files, one or more databases, one or more structured documents, and one or more volatile server memories, and/or may include data executable by at least one of a client and a server. The structured document may include data that describes or encapsulates content. The data stored in the at least one data store may be provided in the structured document or separately from the structured document. In or with the editing logic, additional data may also be provided relating to at least one of the structured document, one or more data stores relating to the structured document and rules relating to editing of the structured document. The associating of the data stored in the at least one data store may comprise logic and/or rules.

The invention has particular application to editing of web pages, e.g., HTML, WML, and HDML. However, the invention is not limited to editing of web pages and has application to editing of other structured documents, e.g., XML, SGML, XHTML and VML. Because of the invention's particular application to web pages, the description below focuses on web pages with the understanding that where appropriate the description applies to editing of structured documents other than web pages.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
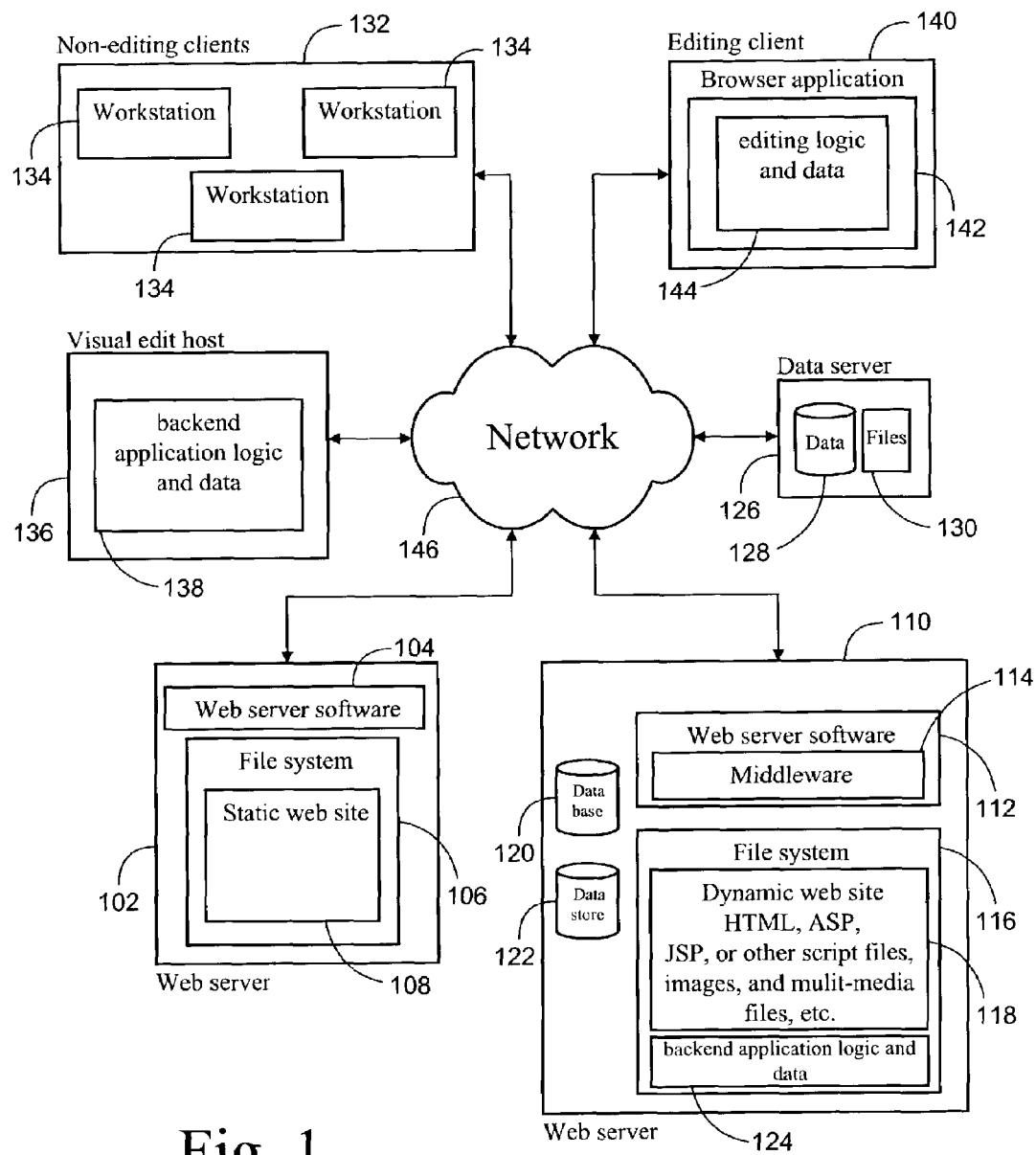
FIG. 1 is a block diagram presenting a configuration of software and hardware components according to one embodiment of the present invention.

With reference to FIGS. 1 through 8, embodiments of the invention are presented. FIG. 1 presents multiple configurations of the hardware and software components for editing a web page or data store providing a web page according to embodiments of the present invention. Content hosts 102 and 110, which may be web servers, deliver multiple types of static and dynamic web pages to workstations 132 and 140 over a network 146. The network 146 may be any public or private local or wide area network, e.g., the Internet or a corporate LAN. Although the network 146 as presented in FIG. 1 is common to all the components presented, the network 146 may comprise a plurality of interconnected disparate networks such as cable, telephone and other high speed data networks.

The system and method of the present invention is applicable to web page delivery systems 102 and 110 that utilize static or dynamic processes to provide web pages. A web server 102 may utilize static processes to provide web pages to clients. web server software 104 receives content requests from client workstations 132 and 140 over the network 146. Although most web traffic conforms to the Hypertext Transmission Protocol (http), the present invention is easily adaptable to alternative transmission protocols. Upon receiving a web page request, the web server software 104 accesses a file system 106 that stores the web page or pages 108 identified by the request. Alternatively, the web server software 104 may access a remote file system 130 resident on a data server 126 over the network 146 for delivery to a requesting client 134 or 140.

In addition to static web pages, web servers 110 may utilize dynamic processes to provide web pages to requesting clients 134 and 140. In a dynamic configuration, workstations 132 and 140 transmit web page requests to a web server 110 where they are received by web server software 112. Files 118, which comprise a combination of markup code and program logic, are maintained in a file system 116. Active Server Page and Java Server Page technologies, developed by Microsoft and Sun Microsystems, respectively, are two popular methodologies for processing files to dynamically generate web pages.

The web server software 112 employs middleware software 114 in order to process files to dynamically generate web pages 118. At run time, the middleware software 114 is instructed to retrieve a given dynamic file 118 from the file system and interpret or compile the contents to produce output web pages that may, for example, comprise markup language code. When interpreting the dynamic file, the middleware software 114 may be instructed to retrieve data from a local database 120 or from a database 128 located on a remote data server 126 from over the network 146 depending on the program logic or parameters passed to the middleware software 114 with the request. Furthermore, the dynamic file may call other server side components required to produce the output content. It should be noted that method for optimizing the delivery of dynamic files, such as precompilation of dynamic files, are well known to those of skill in the art and may be employed in conjunction with the present invention. Where the web server software 112 receives a request for static file, the static file is retrieved from a local or remote source for delivery to the requesting client or clients, thereby bypassing the middleware software, although the middleware software may be used to execute the request, depending on the particular configuration employed by a given institution.

Workstations 134 and 140 request web pages from the web server 102 and 110 through the use of a browser or client viewer application used to request and display the web page (not pictured). One example is MICROSOFT INTERNET EXPLORER™, although other types of web browsers and client viewing applications fall within the scope of the invention. Workstations 134 may be any general purpose personal computer executing one or more of any number of commercially available operating systems, such as MACOS, MS WINDOWS, and UNIX/LINUX.

As contemplated by the present invention, client workstations fall into two general categories: non-editing clients 132 and editing clients 140. Non-editing 132 clients use browser software (not pictured) to render web pages provided by web server software 104 and 114 using static and dynamic processes. An editing client 140, however, is provided with editing logic and data 144 that enables functionality to edit web pages displayed by the browser.

Editing clients 140 request a login web page that may be created using static 108 or dynamic 118 files. Passwords, user identifiers, or other unique login information is supplied by the editing client 140 through the user of the browser application 142, which is passed to the backend application logic 138 or 124. Depending on the particular configuration of the present invention that is deployed, the backend application logic may reside on a dedicated server 136 or may be maintained on a web server 110 that is providing web pages to requesting clients.

Once logged into the system, the backend application logic 138 or 124 transmits editing logic and data ("edit mode") 144 that is run within the browser application and used to allow web pages to be edited directly within the browser application 142. Edit mode 144 comprises a content frame and triggers the content frame to request and render the home page for the web site. An editing client 140 may request web pages from a web server 104 and 114 like any other non-editing client 134 according to one or more of the manners described above. The requested web page is presented through edit mode's content frame.

Edit Mode 144 comprises a graphical user interface (GUI) that is presented to the user within the browser application 142. Specifically, a control is provided to enable or disable the editing functionality of the present invention. As is explained in greater detail herein, the party who is responsible for editing the content page inserts data referred to herein as "hooks" or "hook data", which are used to identify editable areas within a web page. When the editing client 140 instructs edit mode 144 to enable the editing functionality of the present invention, edit mode 144 examines the received web page to identify each of the hooks contained therein. As each hook identifies the start and end point of an editable portion of a web page, as well as providing information regarding the editable portion itself and parameters required to edit the portion, edit mode 144 is capable of identifying each discrete editable portion of a web page. The web page in the content frame is re-rendered with additional parameters and data supplied by edit mode 144 to visually indicate editable content.

Editable portions of the web page are edited directly in the content frame that is displayed by the browser application 142. As the editing client 140 uses edit mode 144 to edit the web page, the changes are immediately made and presented to the user where appropriate. According to one embodiment of the invention, the browser application 142 is Internet Explorer ("IE"). Where IE is so instructed by a transform script setting a portion of a web page's ContentEditable property to "true", edits can be made directly into the rendered page (WYSIWYG edit). Edit mode 144 assembles the edits that have been performed by the editing client 140, as well as the corresponding hooks that define each edited area, and submits the data to the backend application logic 138. The backend application logic 138 analyzes the hooks to determine the proper data store that must be modified with the updated value. Given changes submitted by edit mode 144 are made to the appropriate data sources, and the success report sent to edit mode. Edit mode 144 triggers its content frame to re-retrieve the web page from the web server. It is rendered by the browser application 142 and presented to the editing client 140.

Figure 2:
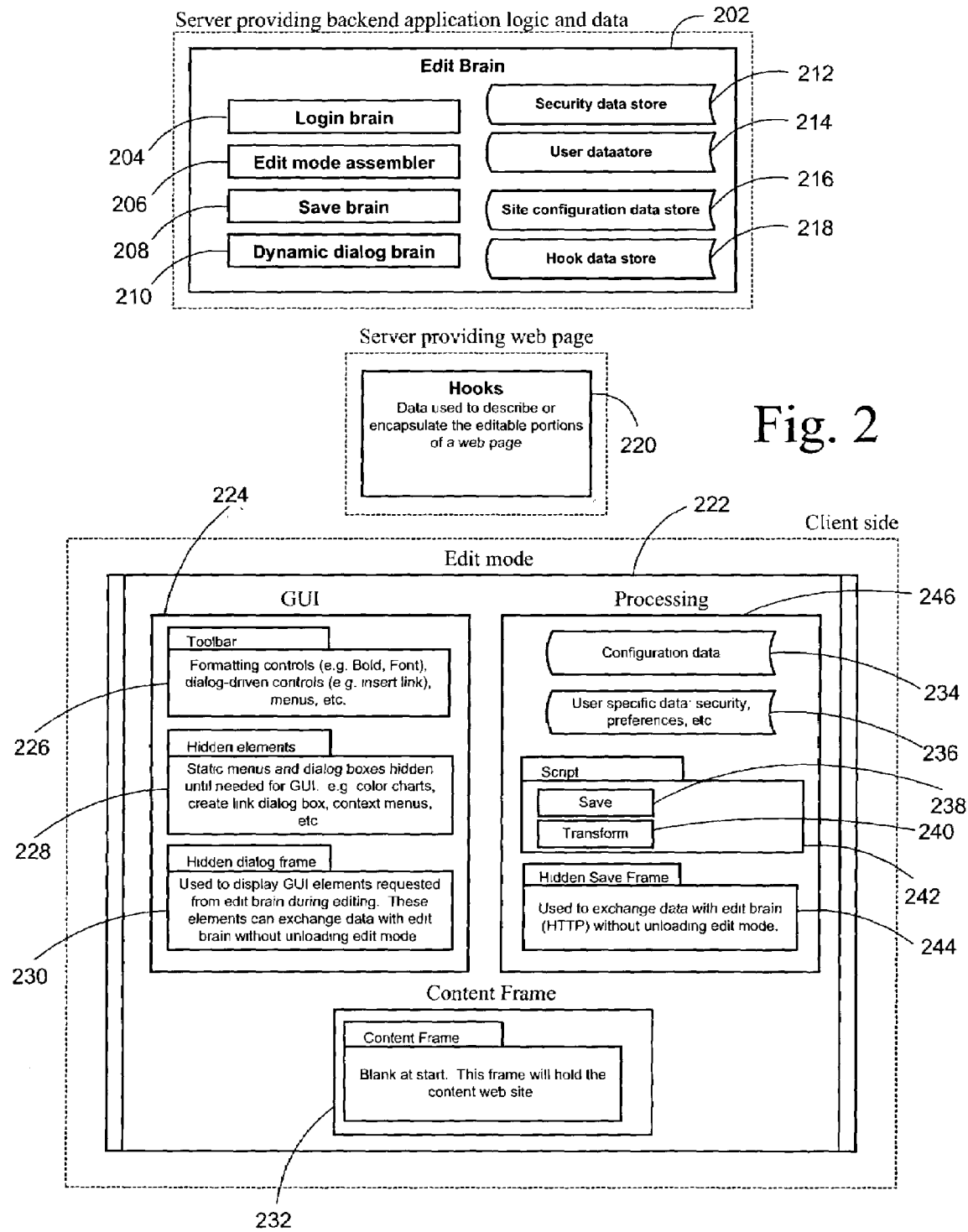
FIG. 2 is a block diagram presenting a configuration of client and server side components according to one embodiment of the present invention.

A more detailed breakdown of the specific components that comprise the backend and client editing logic and data according to one embodiment of the present invention is provided in FIG. 2. As described in FIG. 1, backend application logic resides on a server, which may also be the server providing the web pages, depending on the specific configuration of the invention that is deployed. Backend application logic is herein referred to as the edit brain 202. Edit brain comprises a number of server-side application components 204, 206, 208, 210 and data stores 212, 214, 216, 218 to securely provide editing clients with the ability to edit web pages within a browser application. Editing clients initially request a web page comprising login controls from a given server hosting the edit brain. Login data, e.g., username and password, is transmitted to the edit brain 202 for processing by a process referred to herein as login brain 204. The login brain process extracts identification parameters supplied by the editing client for verification against user and security data stored in both a security data store 212 and a user data store 214.

Where the login brain determines that the editing client has supplied parameters identifying him or her as a valid user of the system, a call is made to a process referred to herein as the edit mode assembler component 206. The edit mode assembler 206 dynamically creates the edit mode editing logic 222, provided to a given verified requesting editing client. The edit mode assembler also extracts data from a site configuration data store 216. This data store 216 maintains global configuration data used by both the client and server side application logic including, but not limited to, the web server domain and start page, an image upload directory, the name and location of the client side edit mode components, the web server's physical root address, information describing data sources used by the web server and associated access information. Where the server hosting the backend application logic is not the server hosting the web server software, ftp information may be maintained in the site configuration data store 216 to allow given edit brain 202 processes access to web pages. Furthermore, where the edit brain provides editing functionality to multiple web servers, the site configuration data store maintains data specific to each web server. The edit mode components are delivered to the editing client and executed within the browser application.

Also comprising the edit brain 202 is a process referred to herein as the save brain processes 208 for allowing an editing client to save edits made to the web page displayed in the editing client's browser application. As is explained in greater detail herein, edits and associated hook data are passed back to the save brain 208 from the client side edit mode components 222. The save brain uses these data to perform lookups on the hook data store 218, which is used to correlate hook data with one or more given data stores where data identified for editing resides. A process referred to herein as the dynamic dialog brain process 210 is also provided to allow the edit brain 202 to dynamically generate dialog boxes, which are presented to an editing client by edit mode 222 for the manipulation of data. In this manner, business rules associated with particular data may be enforced by the server as opposed to being distributed among each of the editing clients.

In order for edit mode 222 to identify editable portions of a web page, editable portions of a web page must be identified by a web page author through the use of hooks and associated with a data source. In addition to identifying editable content, each set of hooks "describes" the data it circumscribes, such as identifying a data source. More abstractly, the hook data may be viewed as any set of logic or third party data that describes portions of a web page not comprising the entire web page. For example, each hook could be based on a known structure of a content site whereby knowledge of the structure imparts knowledge of the type of content located in a given area of the site structure. Alternatively, associating data is provided separately from the web page, such as by including a structural profile of the web page that indicates the editable and non-editable areas of the page. Furthermore, the associating data may comprise rules based on common structures in the web page or by many other techniques known to those of skill in the art, such as through the use of the node-based Document Object Model typically provided to by browser, which may be used to describe areas in a specific web page.

According to one embodiment of the invention, hook data may be embedded within HTML style comments provided as part of a web page. Generally, the syntax may be as follows: <!--VE:X:Y:Z-->. According to this embodiment, the hook is preceded by an HTML start comment delimiter ("<!--"). This is followed by a hook type ("X") and a hook identifier ("Y"). The third parameter of the hook ("Z") may be a bit value indicating whether the hook is the start or end of the editable portion of the web page encapsulated by the hook. Finally, the hook is closed with an HTML end comment delimited ("-->"). web page HTML data comprising a set of hooks is presented in Table 1.

TABLE 1

Hooks in static content page

<html><body>
<!--ve:0:1:1-->
<font color="#0041A5"><b>XYZ Records</b></font> was started in 1996.
Fans can consistently rely on us to release quality albums.
Also be sure to sign up on our <a href="mailing_list.php">mailing list</a>. Thanks.
<br><br>
<a href="mailto:info@XYZ.com">info@XYZ.com</a></b>
<br>
<br>
<!--ve:0:1:1-->
</body></html>

Furthermore, hooks may comprise hook specific parameters or values for inclusion in dynamic web pages as presented in Table 2. When processed, the dynamic web page is delivered to the requesting editing client with data specific to the requested page as shown in Table 3.

TABLE 2

Hooks in dynamic content page fragment on server

<CFIF activities neq " ">
<span clsss="para_header">Professional/Civic Activities</span><BR>
  <!--ve:110:229:1]#attorney_id#]-->
  <CFLOOP index="item" list="#activities#">
    #item#
    <cfif recordcount neq currentrow><BR></cfif>
  </CFLOOP>
  <!--ve:110:229:0-->
  <br><br>
</CFIF>

TABLE 3

Hooks in dynamic content page fragment on client

<span class="para_header>Professional/Civic Activities</span><BR>
  <!--ve:110:229:1[20]-->
    Eros et accumsan et iusto
  <!--ve:110:229:0-->
  <br><br>

Edit mode 222 comprises the client side application logic, which is a collection of application logic and data executed within the browser application executing on an editing client's workstation. The application logic and data of edit mode 222 may be described as falling to three general categories: GUI 224, processing 246, and the content frame 232. The GUI components 224 comprise a plurality of both graphical and off-screen controls presented to the editing client, thereby allowing for editing of portions of the web page within the browser application. The main GUI component 224 is the toolbar 226, which is presented within the browser application window as a plurality of graphical controls as is well known to those of skill in the art. For example, toolbar GUI components may include formatting controls such as bold and font controls, dialog driven controls such as to enter URL or similar network address information, menus, and controls to enable and disable the editing functionality of the present invention.

In addition to the toolbar, the GUI components 224 of edit mode 22 also include a set of off-screen hidden elements 228. Hidden elements 228 are graphical controls that are not displayed until they are required by the editing client, typically in response to the occurrence of a given type of action. These off-screen elements 228 include controls such as static menus and dialog boxes, e.g., color charts, context menus, and link creation dialog boxes. Also provided is a hidden dialog frame 230. The hidden dialog frame 230 is a container used to display GUI elements that are requested from the edit brain 202 during the editing process, e.g., a dialog dynamically generated by the dynamic dialog brain 210. These elements 230 can exchange data with the edit brain 202 without unloading edit mode 222 from the browser application's memory space.

In addition to the GUI components 224, edit mode further comprises processing application logic and data 246. Data maintained by edit mode comprises both configuration data 234 and user specific data 236. According to one embodiment, configuration data 234 comprises selected data extracted by the edit mode assembler 206 from the site configuration data store 216. For example, edit mode 222 must trigger the content frame 232 to load a web site start page upon delivery of edit mode to the editing client, which is defined in the configuration data 234 for a given web site. Additionally, user specific data is maintained for use by other edit mode components 222.

Processing application logic and data 246 also comprises one or more scripts 242. Script code, for example, JavaScript and VBScript, allows functionality to be automated at a editing client's browser application. The script 242 is deciphered by an interpreter that is typically distributed as part of the browser application, although an interpreter may also be transferred to the editing client upon request according to an embodiment of the invention. Exemplary scripts include a save script 238, which initiates the save process in conjunction with application logic resident on the server, and a transform script that identifies hooks within a web page and transforms the web page to indicate editable portions within the web page. A hidden save frame 244 is provided in order to exchange edit data between edit mode 222 and the edit brain 202 without unloading edit mode 222 from the browser application's memory space.

The third general category comprising edit mode 222 is the content frame 232. The content frame 232 operates to present web pages for interacting, browsing, viewing and editing, which is performed directly within the content frame 232. When the edit mode assembler 206 delivers edit mode 222 to the editing client, the content frame is initially blank. Data comprising the configuration data 234 defines the start page for the web site with edit mode triggering the content frame to retrieve the start page. As the editing client navigates to other web pages comprising the web site, each web page is rendered by the browser application and presented within the content frame 232 as per a non-editing client's use of the web site.

Figure 3:
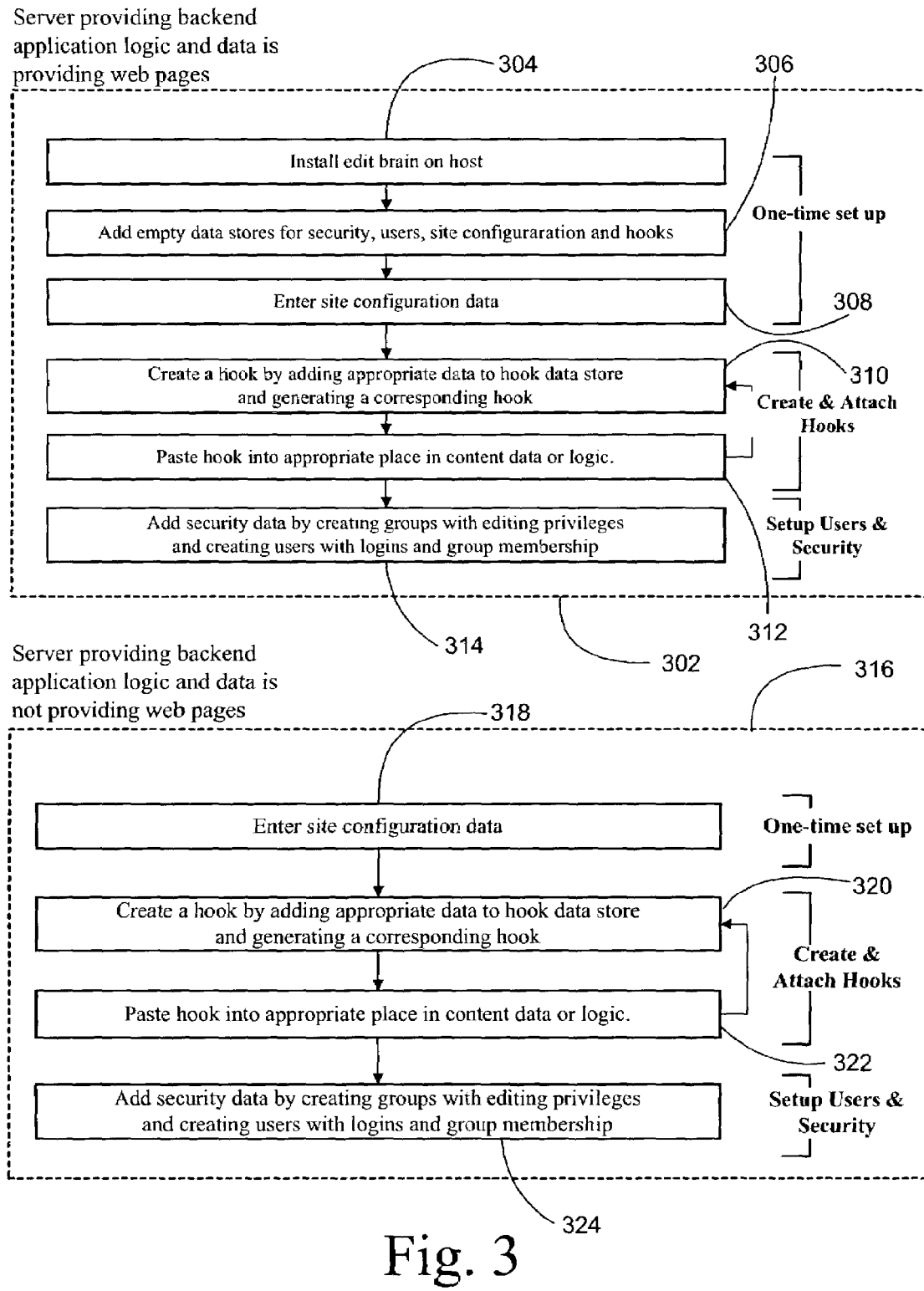
FIG. 3 is a flow diagram presenting processes for configuring the invention on a web server or stand-alone server according to embodiments of the invention.

As indicated in FIG. 1, the backend application logic and data may be hosted on the same physical server hosting the web pages managed by the back end application. FIG. 3 presents methods of installing and initializing the visual edit application both where the backend application logic is hosted on the server hosting the web server software and where the backend application logic is not hosted on the server hosting the web server software. Where the same server is hosting the backend application logic and web server software 302, a user with administrator or similar privileges on the server hosting the web server installs the edit brain on the server, step 304. Preferably, the installation process of step 304 may be implemented through the use of automated installation scripts such as those that are well known to those of skill in the art. As described in FIG. 2, empty data stores are generated to maintain security, user, web site configuration, and hook data, step 306. Completing the one time set up procedure, web site configuration data is supplied and stored in the site configuration data store, step 308. At this point, the edit brain is installed and initial configuration is complete, steps 304, 306 and 308.

Authors of content pages typically determine those portions of the web page that are amenable to editing, although this determination may indeed be made after the fact by a designer of an overall site or administrator dedicated to the purpose. A hook is created to identify an editable portion of a web page, in addition to providing the edit brain with indication of the type of content identified by the hook, step 310. Data is also added to the hook data store to enable the edit brain to identify the type of data encapsulated or described by the hook and enable updates to the web page or data store in response to edits generated by an editing client step 310. The hook data is added to the appropriate location within the web page, step 312. The process of generating hook data 310 and placing hooks within web pages at desired locations to identify editable portions of a web page 312 is repeated for each editable portion on each web page comprising the web site.

The web site or similar administrator must also set security details to restrict access to the editing functionality of the present invention vis-à-vis the web site, step 314. According to one embodiment of the invention, user data, including usernames and passwords, is maintained in appropriate data stores; each user has all or none access based on the presence of their username and password in the data stores maintained by the edit brain. Alternatively, it is advantageous to maintain security data by creating access groups whereby each group allows varying levels of access to advanced editing functionality provided by the invention. In this manner, the administrator is capable of restricting access with extremely fine granularity, e.g., allowing editing clients access to only certain hook types that are enumerated in the security group to which the editing client belongs.

As described in FIG. 1, embodiments of the invention are contemplated whereby the backend application logic resides on a different server from that used to host the web server software. In this manner, the backend application logic is capable of concurrently providing editing functionality to a plurality of web servers. Where the server hosting the web server is not also hosting the backend application logic 316, there is no need to install the edit brain and generate data stores because the backend application logic and data is maintained by a third party. The administrator of the web server prepares site configuration data, step 318, typically supplying details such as the address of the web site domain and starting web page, an image upload address, the root directory where the web server is maintained, as well as FTP information. FTP information allows the edit brain to access the file system on the web server where web pages and other data are maintained.

The web page author or web site administrator defines hooks by adding hook data to the hook data store and generating one or more corresponding hooks, step 320. Each web page comprising the web site is analyzed to determine editable portions and appropriate hooks are inserted to encapsulate the editable content, step 322. This process 320 and 322 is repeated to identify all editable portions of each web page comprising the web site. User groups are created to define varying levels of editing privileges and associated with user records created and maintained in the user data store, step 324.

Figure 4:
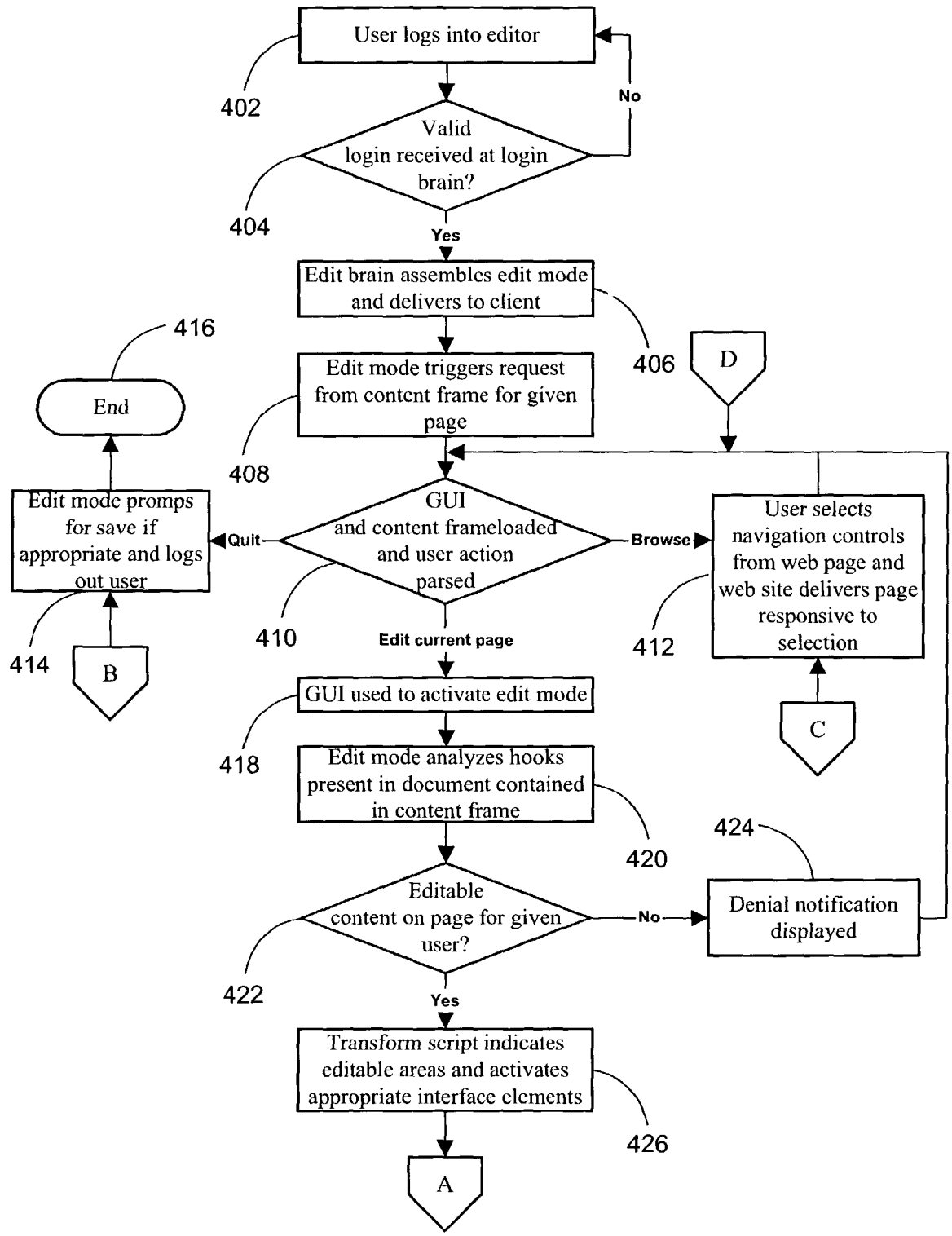
FIG. 4 is a flow diagram presenting a process for browsing, editing and saving changes to a web page according to one embodiment of the present invention.

One embodiment of a method for operating embodiments of the system presented in preceding figures is illustrated in FIG. 4. Using a web browser, an editing client navigates to a login page in order to log into the editor for the web site, step 402. The login brain receives login information provided by the editing client via the login page and performs a validation check, step 404. Where the login brain is unable to validate the login information provided by the editing client against user and security data maintained by the edit brain, an error message is returned and the editing client is provided with a subsequent opportunity to provide valid login information, step 402. If the login brain is able to validate the provided login information, step 404, the edit brain assembles the edit mode components, which are delivered to the editing client, step 406.

The browser application executing at the editing client's workstation receives and loads the edit mode components, step 406, and edit mode triggers a request from the content frame to retrieve the start page from the web site, step 408. The GUI components of edit mode are loaded into the browser application's window, the given web page from the web site is loaded into the content frame, and edit mode parses the user action, step 410. Where the editing client selects a logout control from the toolbar or other GUI component, edit mode prompts the editing client to save any edits, if appropriate, and logs the user out of the system, step 414. Processing ends and edit mode is unloaded from the browser, step 416.

Where a browse command is received from the editing client, step 410, for example, the editing client selects a hyperlink from a page, program flow is directed to step 412 where the browser application responds to the specific navigation control that is selected. For example, the browser reacts to a browser back command differently from a browser forward command or selection of a hyperlink. The request is passed to the web server, which returns a web page that is responsive to the command supplied by the editing client, at which point edit mode and the browser continue to parse received user input, step 410.

One action parsed for is an indication from the editing client to edit the web page loaded in the content frame, step 410. Using the graphic interface presented by edit mode, an editing client selects a control provided to enable the editing of the web page directly within the browser application, step 418. Edit mode analyzes or parses the web page loaded in the content frame to detect the presence of hooks within the web page, step 420. Security data regarding the editing client is retrieved and a check is performed to determine if the client has permission to edit one or more selected portions of the web page, step 422. Where the editing client does not have permission to edit any of the editable portions of the web page, an error message is displayed in the content frame communicating the error state, step 424. Alternatively, where the check indicates the editing client has permission to edit the web page, step 422, edit mode executes the transform script to modify the web page in order to indicate editable portions of the web page and activates appropriate interface elements, step 426.

The output from the transform script is passed to the content frame and presented to the editing client, step 426. Processing continues with FIG. 5 where edit mode parses user input, step 502. A first user action parsed for is a request for an inline edit. When the editing client selects an inline editable text block, an insertion point is placed in the text and the editing client is free to modify the text. Edit mode re-writes the markup as the edits are entered by the editing client, which is re-rendered to display the editing changes, step 504. When the inline edits are complete, edit mode continues to parse user input for an actionable event, step 502.

Edit mode also parses for controlled editing whereby business rules enforce the validity of data values entered by editing clients. Where edit mode parses such a request, dialog boxes responsive to the specific edit command received from the editing client are generated and presented on the editing client's workstation as part of edit mode's GUI, step 506. The editing client edits data through the dialog, which maintains data integrity and business rules, and edit mode continues to parse user input for an actionable event, step 502. Likewise, other triggers may be parsed by edit mode whereby miscellaneous functionality is executed, step 508, and processing returns to step 502.

Where the editing client issues a save command to edit mode, step 510, edit mode composes an update message comprising the save data (the edits made to the web page) and the hooks associated with each of the edits performed. According to embodiments of the invention, other information available at the editing client is included in the update message, e.g., a web page URL and other parameters. The update message is transmitted over the network from edit mode at the editing client to the edit brain, specifically, to the save brain for further processing, step 512. The save brain receives the update message and updates the web page or data store used by the web server to provide the web page based on the hooks comprising the update message and the save data associated with each of the hooks, step 514. The save brain transmits a response back to edit mode indicating the success or failure of the update process, step 516.

A check is performed on the response message to determine whether the edits were successfully saved in the web page or one or more data stores used by the web server to provide the web page, step 518. Where the update has failed, step 518, edit mode communicates this state to the editing client, for example, by displaying a save failure web page in the content frame or in a modal dialog box, step 320. If, however, the response message indicates that the save was successful, step 518, edit mode triggers the content frame to reload the web page for the web site, which should reflect the edits made to the web page previously viewed by the editing client, step 522. Regardless of the success or failure of the save process, step 518, processing is directed to step 410 where edit mode or the browser continues to parse user input and execute functionality responsive to the input.

If the editing client logs out, processing returns to step 414 where edit mode prompts the editing client to save if appropriate. Where edits need to be saved before edit mode is unloaded from memory, a save process generally analogous to steps 510, 512, 514, and 516 is executed. After any edits the editing client needs to save are written to the web pages or data stores, edit mode is unloaded from memory and the process completes, step 416. If the editing client browses away from the web page that is currently being viewed or edited, processing returns to step 412 where the navigation control selected by the editing client is executed and the browser loads the web page responsive to the selected navigation control.

Figure 6:
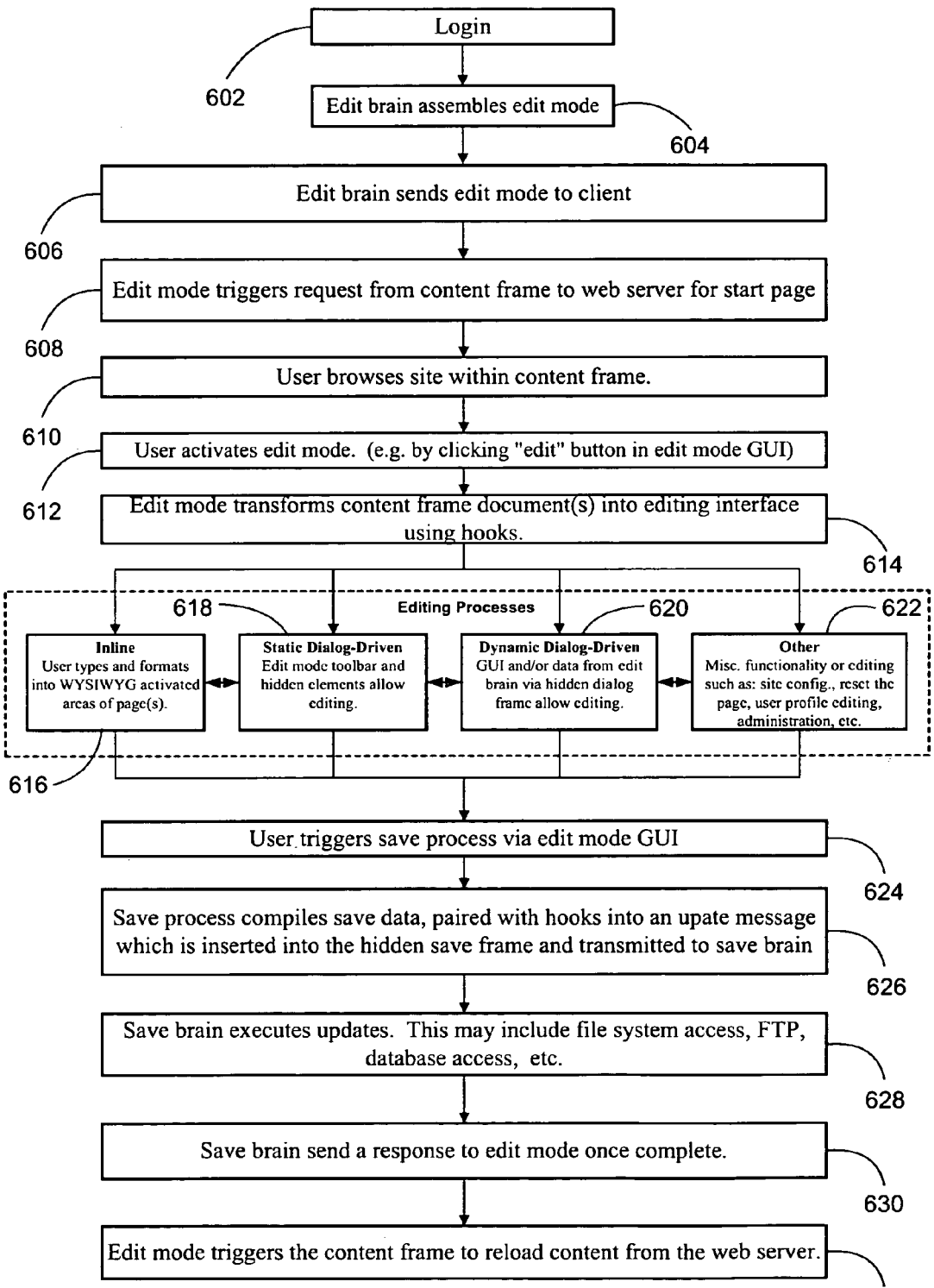
FIG. 6 is a flow diagram presenting a process of editing a web page according to one embodiment of the present invention.

A flow diagram presenting a more detailed example of the web page editing process is presented in FIG. 6. The editing process typically begins with the user logging into the editing system, step 602. Upon receiving and validating a login request from an editing client, the edit brain assembles software components required for operation of edit mode, step 604. The edit mode components are received by the browser application or similar content rendering system and executed in memory, step 606. Selected software components of edit mode issue a request to the content frame, triggering the content frame to issue a request to the web site for the web site's starting web page, step 608. According to one embodiment of the invention, the address used to request the starting web page from the web site is defined in configuration data derived from a data store on the server and delivered along with the edit mode software components.

With edit mode installed in memory and the web site's starting web page loaded in the content frame, the editing client is free to browse the web site as would any non-editing client in a manner well known to those of skill in the art, step 610. At any point during navigation after the editing client is logged into the editing system, the editing client may enable the editing functionality provided by the invention, step 612. Preferably, the editing client enables the editing functionality by selecting an "edit" button presented via edit mode's GUI. In response to enabling the editing functionality, step 612, edit mode analyzes the web page displayed by the content frame and, based on the presence of hooks encapsulating portions of the web page, visually transforms the web page to reveal an editing interface, thereby displaying editing controls based on the hooks, step 614.

Once editing functionality is enabled, program flow forks according to the specific editing actions taken by the editing client. Where inline edits are made to static text within a web page, the editing client types and formats freeform text into the area presented by edit mode, step 616. In order to enforce business rules, static dialog boxes are delivered to the editing client as part of the edit mode software components. When an editing client attempts to edit data associated with a dialog box comprising data editing controls, hidden elements are brought into view for the editing client to interact with and modify data values on the web page, step 618. Similarly, edit mode, in conjunction with process executed on the server by the edit brain, dynamically generate and present data control dialog boxes comprising editing controls to modify data values on the web page, step 620. Alternatively, commands from the editing client for miscellaneous functionality are provided for and acted upon, step 622, for example, web page reloads, user profile editing, system administration, etc.

A given edit is made to a portion of the web page and confirmed by the editing client through the edit mode GUI, which triggers a save process, step 624. On the client side, the save process compiles the edits made by the editing client, in combination with data comprising the hooks that encapsulate the edited data, into an update message that is transmitted to the save brain process on the visual edit host, step 626. The update message may also comprise additional client side data, such as the web page URL and other web page parameters. According to one embodiment, the message is inserted in to a hidden save frame and transmitted to the save brain process. The save brain executes the update by modifying the data store used by the web server to provide the web page in accordance with the edits provided by the editing client, which may include file system access, FTP transmission, database access, etc., step 628. The save brain transmits a response to edit mode upon completion of the update indicating the success or failure of the operation, step 630. Edit mode triggers the content frame to reload the web page from the web server, thereby presenting the edited web page to the editing client, step 632.

Figure 5:
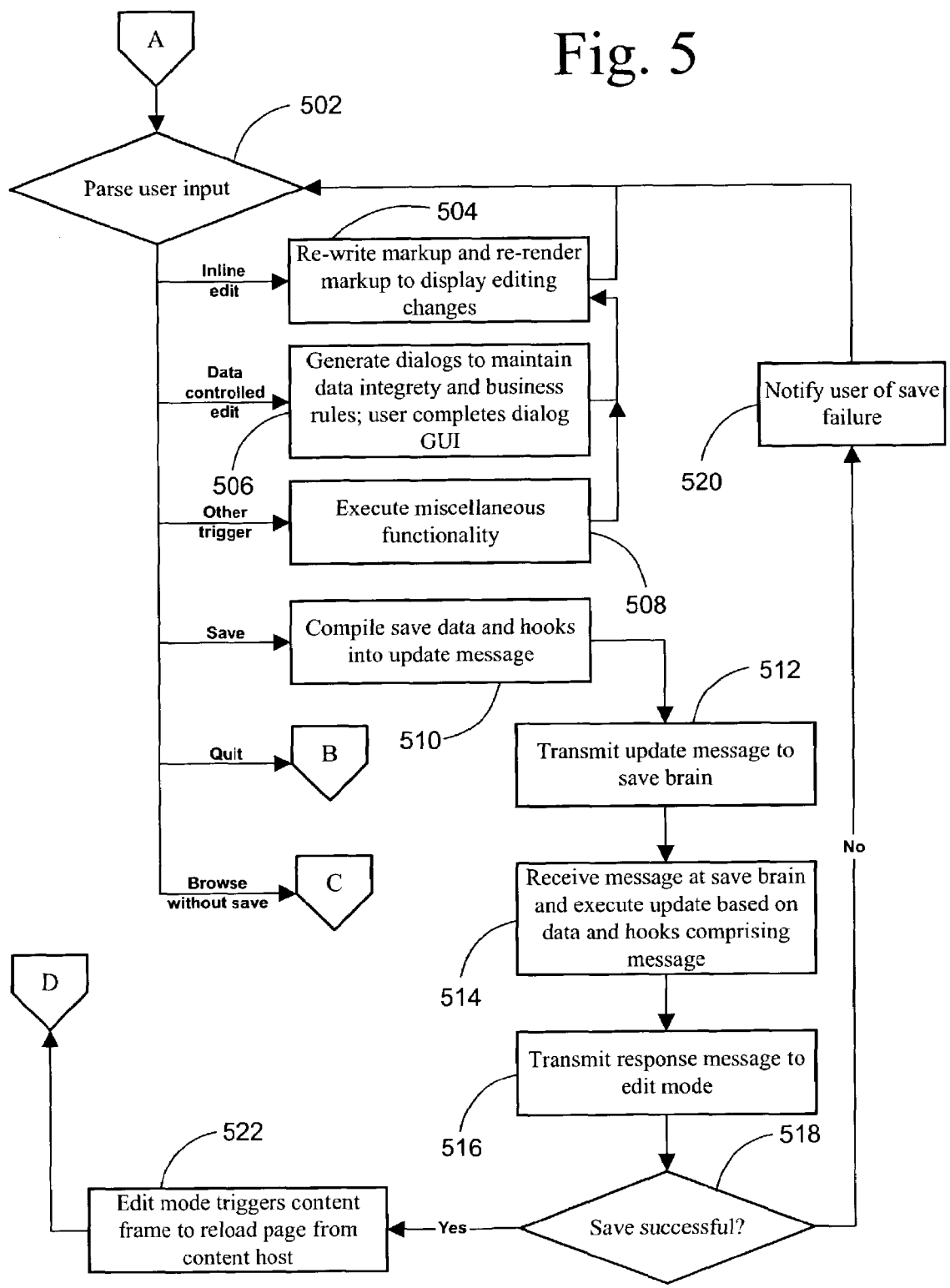
FIG. 5 is a flow diagram continuing the process for browsing, editing and saving changes to a web page according to one embodiment of the present invention.
Figure 7:
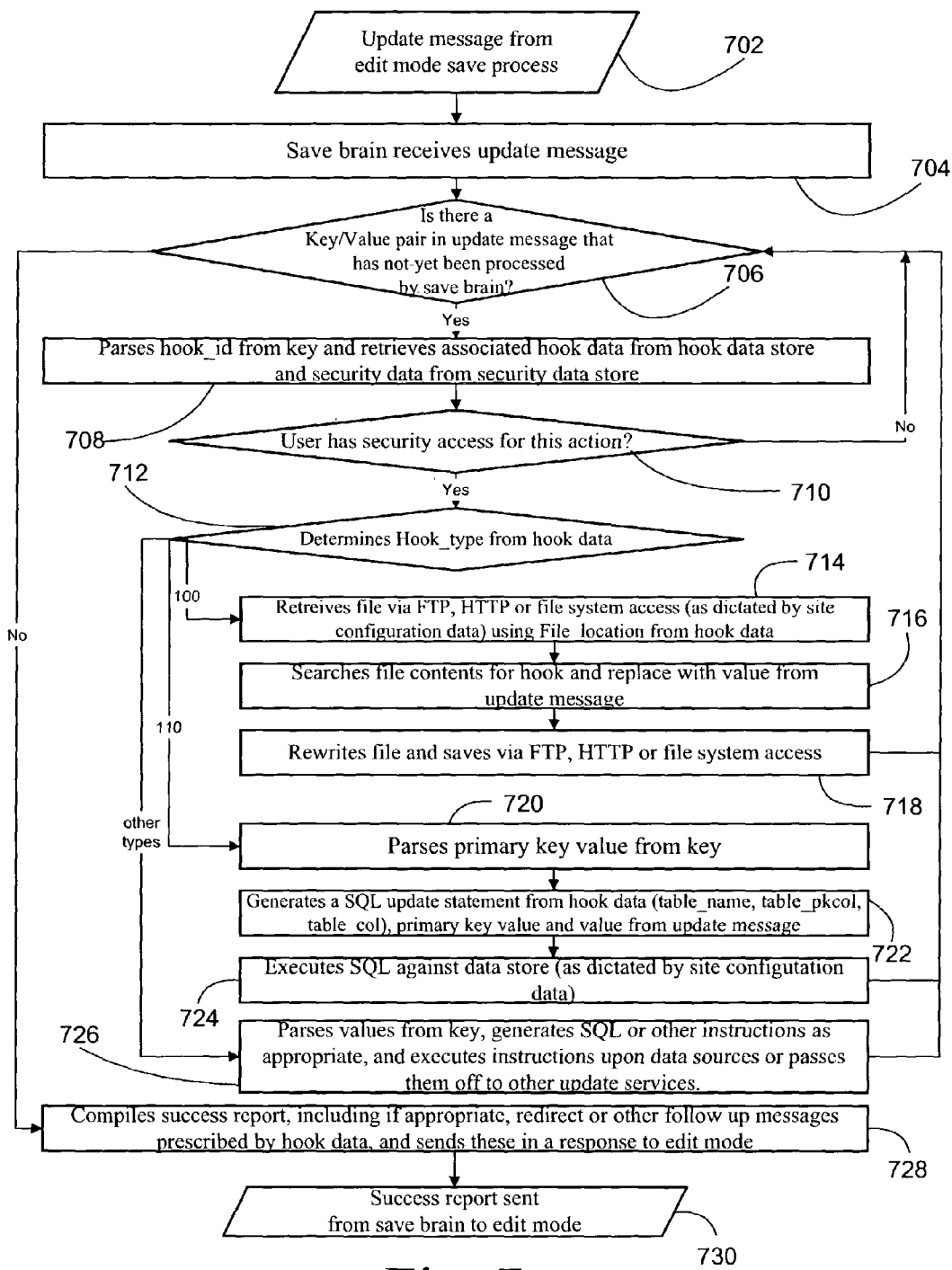
FIG. 7 is a flow diagram presenting a process for saving changes made to a web page according to one embodiment of the present invention.

The save process presented in FIG. 5 is built on in the flow diagram of FIG. 7, which provides a more detailed embodiment of the save process. When an editing client saves edits made to a web page within the browser application, edit mode's save process generates an update message comprising one or more edited portions of the web page to be saved, as well as the hooks associated with each piece of data, which is transmitted over the network to the edit brain's save process, step 702. The save brain receives the update message and extracts the data contained therein for analysis, step 704. Where there are key/value pairs contained in the update message that require processing, step 706, the save brain parses the hook identifier from the key and retrieves associated hook data from the hook data store and security data from the security data store, step 708. Alternatively, the key/value pair itself is all that is required in order to enter the edits made to a given portion of the web page by the editing client.

For the given hook being analyzed, step 708, the save brain determines, based on the security information, hook identifier, and user information from the update message, whether the editing client has access to perform the editing action, step 710. Where the editing client does not have sufficient access privileges, processing returns to step 706 and the next key/value pair is analyzed. If the user has sufficient access privileges, the save brain determines the hook type from the retrieved key or hook data, step 712. It should be noted that hook types that are trapped for by step 712 are exemplary and not meant to be limiting. It should be clear to one skilled in the art that other data that may be used to identify content types in an analogous manner to the hooks and hook data. A listing of exemplary hook types and descriptions can be found in Appendix A.

Where the update message comprises a hook of type "100", indicating that a static page is to be edited, the save brain retrieves the web page via FTP, HTTP or from a local file system (as dictated by the site configuration data) using the file location identified in the hook data or additional data provided by the editing client, step 714. The save brain searches the web page for the identified hook and replaces the portion of the web page encapsulated by the hook with the value associated with the current key in the update message, step 716. The edited file is rewritten to its source location by the access method dictated in the site configuration data, step 718, and the next key/value pair is processed, step 706.

Where the update message comprises a hook of type "110", indicating that a dynamic text area is to be edited, the save brain parses the primary key value to determine the database or other data store maintaining the dynamic text from the key/value pair, step 720. To execute the update, the save brain generates a SQL update statement comprising hook data retrieved from the hook data source, e.g., table name, primary key column, column(s) to return for result set, etc., the primary key value, and the value from the key/value pair in the update message, step 722. The save brain, possibly in connection with a database management system, executes the generated SQL code against the data store, step 724, as dictated by the site configuration data, e.g., a relational database management system. The next key/value pair is processed, step 706.

The save brain may also identify other defined hook types comprising the update message in order to handle other editing functionality, step 712. The save brain parses values the key/value pair and generates SQL code or other instructions as is appropriate, step 726. The save brain executes the generated instructions upon defined data store. Alternatively, the save brain may pass instructions off to external update services for processing. The instructions are executed, step 726, and the next key/value pair is processed, step 706.

A check is performed to determine if additional key/value pairs exist in the update message that have not been processed by the save brain, step 706. If all the key/value pairs comprising the update message are processed, the save brain compiles a success report, step 728. Where appropriate, the success report may include redirect or other follow up message defined by the hook data, which is sent in a response message to edit mode, step 730, for potential further client side processing.

Figure 8:
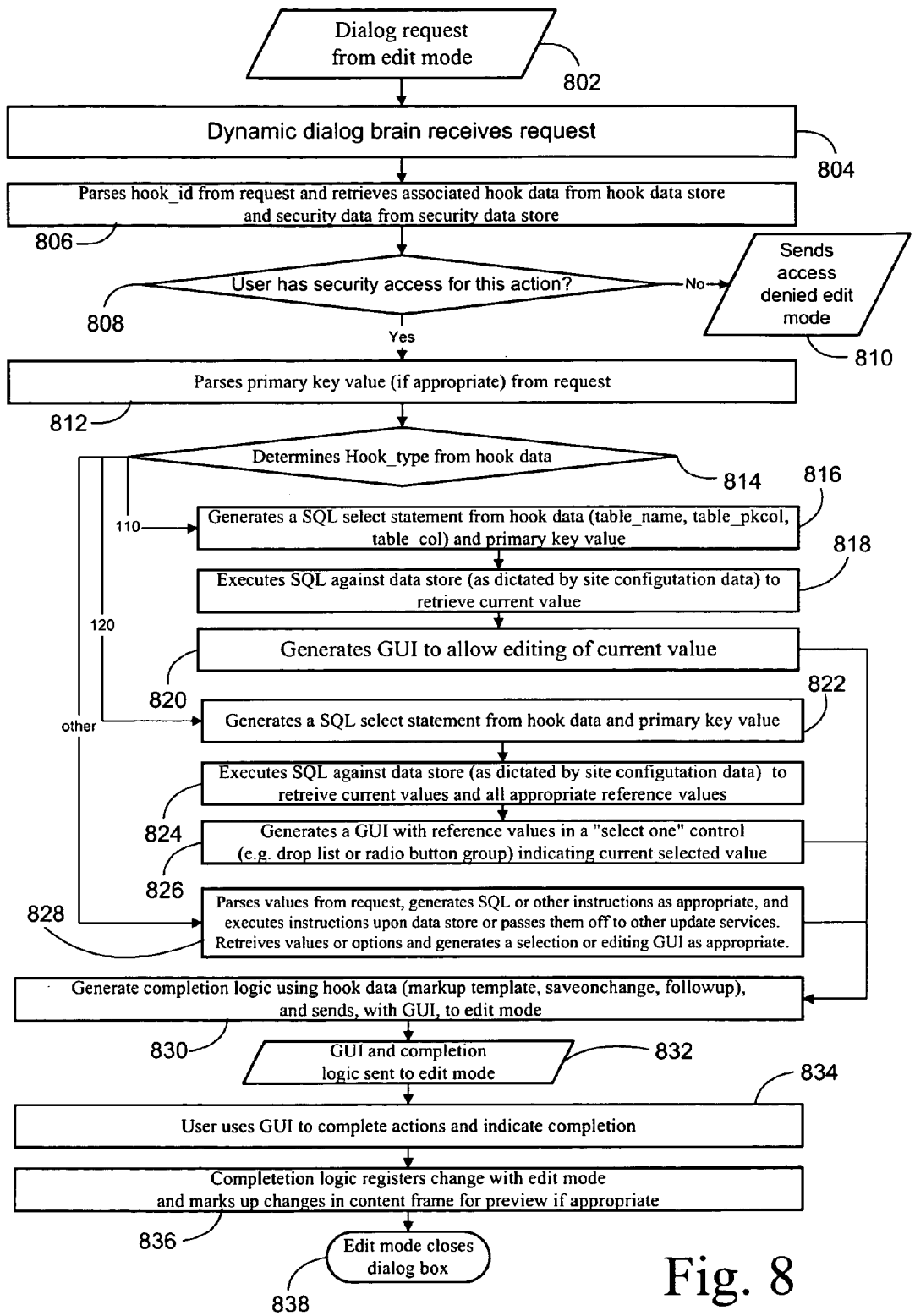
FIG. 8 is a flow diagram presenting a process for dynamically generating data control dialog boxes for use in editing web pages according to one embodiment of the present invention.

The edit brain comprises functionality whereby data control dialogs are dynamically generated for presentation to the editing client in response to certain data editing requests, thereby allowing for centralized enforcement of business rules at the server. FIG. 8 presents one embodiment of a method for receiving requests for dynamic dialogs for presentation to an editing client in response to a dialog request from edit mode, step 802. The dynamic dialog brain process of the edit brain receives the dialog request and extracts the information contained therein, step 804. The dynamic dialog brain further parses the hook identifier from the dialog request and receives associated hook data from the hook data store and security data from the security data store based on the identify of the editing client, step 806.

A check is performed to determine if the editing client requesting the dynamic dialog in order to edit a portion of the web page has appropriate access to the functionality requested, step 808. Where the editing client is not a member of a group with sufficient access privileges to edit the data controlled by a requested dynamic dialog, step 808, an access denied message is sent to edit mode for presentation to the editing client, step 810. Edit mode may present this message in any number of ways known to those of skill in the art. If the editing client has sufficient access privileges to access the data controlled by a requested dynamic dialog, a primary key value is parsed from the dialog request where appropriate, step 812.

The dynamic dialog brain determines the hook type from the hook data, step 814, and performs an appropriate action responsive to the hook type. It should be noted that hook types that are trapped for by step 814 are exemplary and not meant to be limiting. It should be clear to one skilled in the art that other data that may be used to identify content types in an analogous manner to the hooks and hook data.

Where the hook type evaluates to "110", indicating a control for editing a dynamic text area is to be generated, the dynamic dialog brain generate a SQL select statement, step 816. The SQL select statement may comprise the primary key value, as well as components of the hook data, e.g., table name, the name of the column designated as the primary key, the column to return as the result set, etc. The generated SQL select statement is executed against the data store used by the web server to provide the web page, as defined by the site configuration data, to retrieve the current value encapsulated by the hooks defined in the dialog request message, step 818. A GUI dialog control is generated for presentation to the editing client whereby the editing client may modify the value(s) contained in the data store, step 820.

Where the hook type evaluates to "120", indicating a select one control (used to describe output generated from resolving a one-to-one relationship between a primary entity and a reference table) is to be generated, the dynamic dialog brain generates a SQL select statement based on the primary key value and hook data, step 822. The SQL select statement is executed against the data store, as dictated by the site configuration data, to retrieve one or more current values and all appropriate reference values, step 824. A GUI select one control, e.g., a drop down list or radio button group, is generated for presentation to the editing client with the current selected value presented on the web page indicated through the control's interface, step 826.

Where the hook type evaluates to other identifiable hook types, the data values are parsed from the request and used to generate SQL or other instruction code as is appropriate given the evaluated hook type, step 828. The instructions are executed upon one or more identified data stores, or alternatively passed off to other local or remote processes for execution. The result received from the execution of the SQL or other instruction code is used to generate a selection or editing GUI control as is appropriate given the evaluated hook type.

Regardless of the hook type identified and processed by the dynamic dialog brain, processing is directed to step 830 where completion logic is generated using the hook data and sent to edit mode. According to various embodiments of the invention, completion logic may comprise logic to facilitate execution of the editing transaction performed by the editing client. The generated GUI controls and completion logic is sent to edit mode for presentation to the editing client, step 832. Using the GUI controls, the editing client performs edits to portions of the web page and indicates completion of edits capable of being performed with the current GUI controls, step 834. The completion logic registers the edits performed by the editing client and registers the edits with edit mode, step 836. Where appropriate, edit mode marks up the web page in content frame with edits made by the editing client for presentation. Upon completing the edits through the dynamic dialog, edit mode closes the dialog, step 838.

Figure 9:
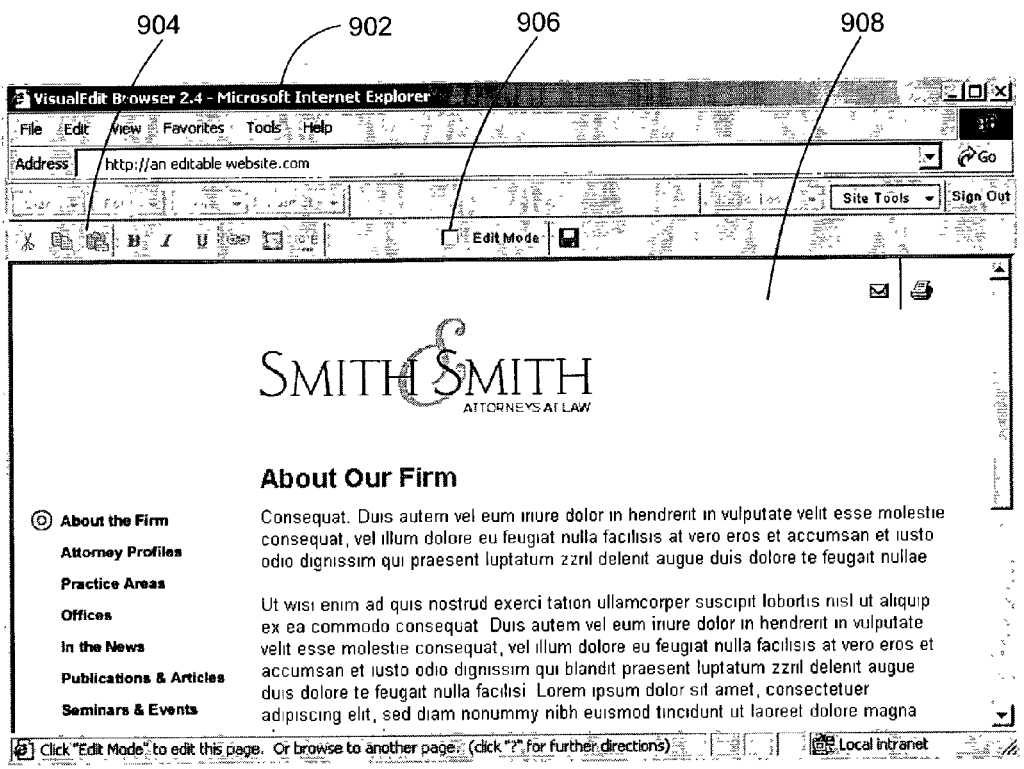
FIG. 9 is a screen drawing presenting a web page displayed to a client.
Figure 10:
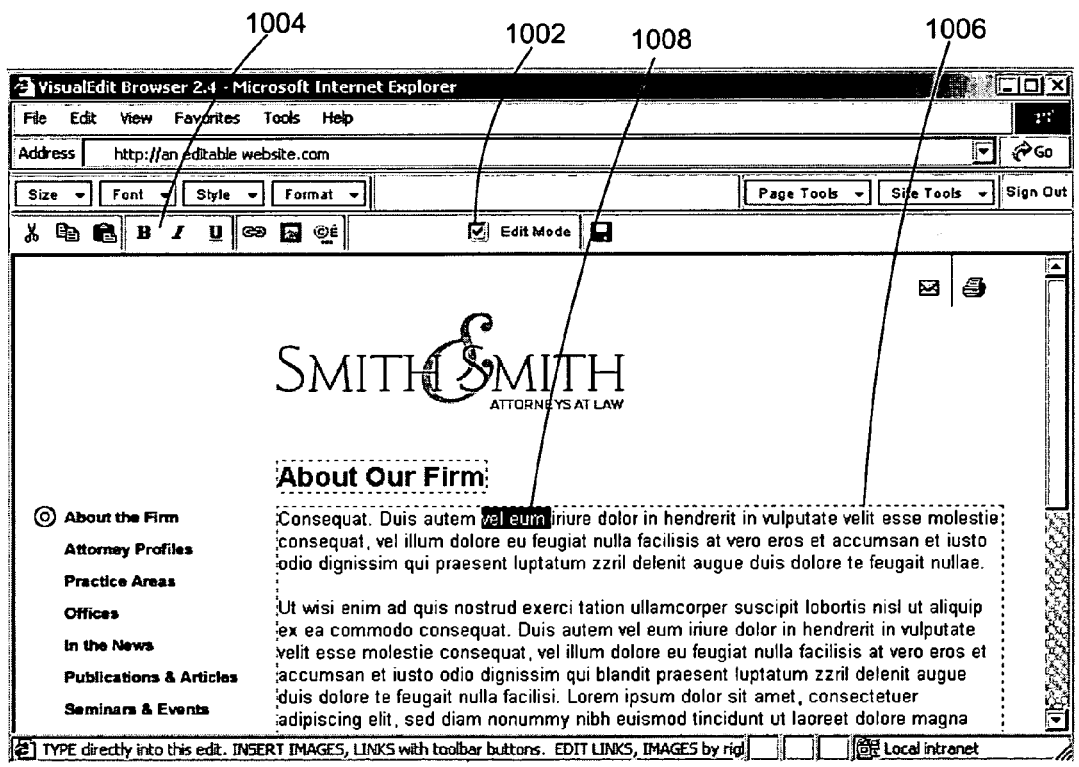
FIG. 10 is a screen drawing presenting a web page identifying editable portions of the web page.
Figure 11:
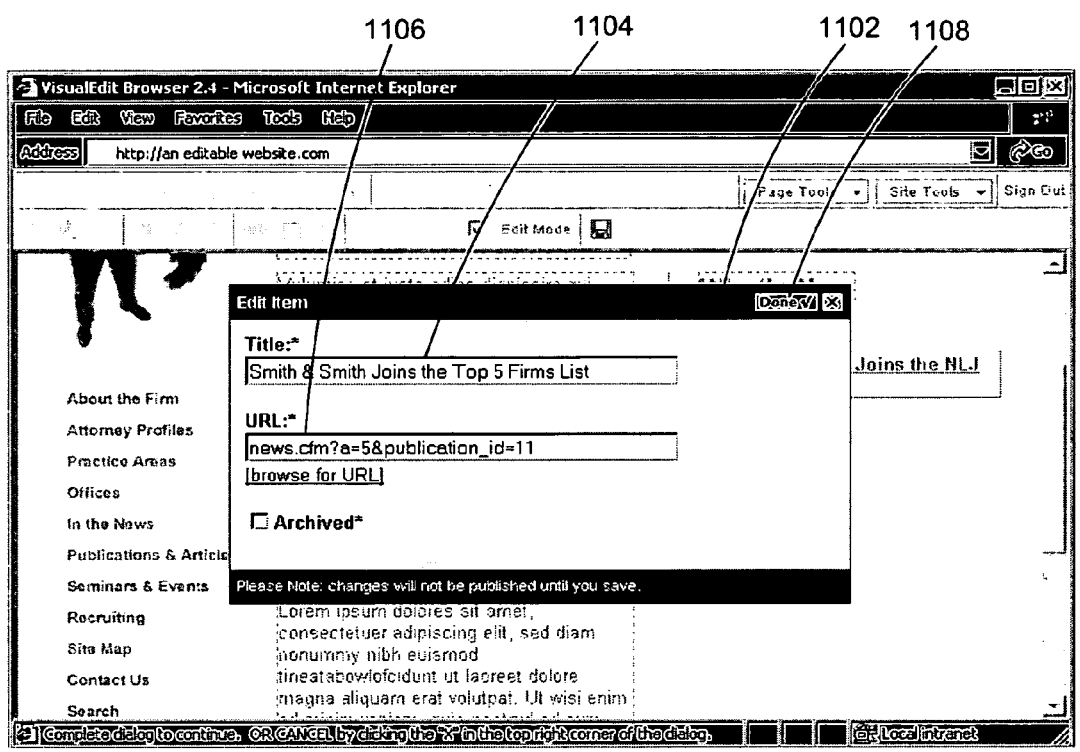
FIG. 11 is a screen drawing presenting text entry controls within a dialog box for interaction with an editing client.

Turning to FIGS. 9 through 11, a series of screen drawings are presented that illustrate embodiments of a graphical interface of the present invention. FIG. 9 presents a web page 908, which when delivered by a web server appears identical to both editing and non-editing clients, e.g., the same web page is delivered to both classes of clients. According to this embodiment, the web page 908 is presented to the client, either editing or non-editing, in the context of a web browser 902. According to the illustration of FIG. 9, one can see that an editing client is accessing the web page 908 from the presence of a graphical toolbar 904 comprising several editing controls is provided with the browser 902 only to authorized editing clients. When the editing client decides to edit a portion of web page, he or she selects a checkbox 906 to enter edit mode, which executes the transformation script within the browser 902 to reveal the editable portion or portions of the web page 908.

Upon selection of the edit mode control, various modifications are made to the web page and graphical controls as shown in FIG. 10. Selection of the edit mode control 1002 allows an editing client to create or modify editable portions of the web page 1006. Editable portions of the web page 1006 are graphically presented to the editing client, thereby allowing edits to be made directly within the web page 1008. In the illustration of FIG. 10, the editable portion of the web page 1006 comprises text, which may be modified by selecting text and supplying text data, which may also comprise highlighting text for modification or deletion 1008. Furthermore, entry into edit mode 1002 by an editing client provides access to editing tools in the graphical toolbar 1004, thereby allowing advanced formatting of editable portions of the web page in addition to other functionality described above in detail.

The screen drawing of FIG. 11 builds on the screen drawing of FIG. 10 by presenting text entry controls within a dialog box 1102. As described above, this technique allows business rules to remain centralized for all editing clients. The particular dialog presented in FIG. 11 allows for modification of a record in a database containing a URL, title, and archive flag. A first text entry control 1004 is provided that allows modification of the tile text that is displayed on the web page. A second text entry control 1006 is provided that allows for the editing client to supply a URL or address that is associated with the title text. Upon supplying the data, the authoring client may select a "done" control that displays the changes within the web page. Upon saving, the database records are updated to reflect the changes.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

APPENDIX A

Hook Types with Name and Comments

| Hook_Type | Name | Comments |
|---|---|---|
| 100 | Static | used to describe text in a file |
| 110 | Dynamic Text Area | used to describe text in a data base cell |
| 120 | Select One | used to describe output generated from resolving a one-to-one relationship between a primary entity and a reference table |
| 130 | Select Multiple | used to describe output generated from resolving a one-to-many relationship described by a primary, reference and join table |
| 131 | Select Multiple (ordered) | same as above with a sort order field in the join table |
| 150 | Add Entity | used to describe the insertion of multiple pieces of data into several cells, rows, and/or tables which together create a new logical entity. E.g. a new employee with first name, last name, departments, and etc. (sub hooks of hook_type 200–240 are created to describe each piece of data) |
| 155 | Edit Entity | As above, but used to edit rather than create multiple pieces of data at once |
| 210 | Plain Text | subhooks for 150, 155 |
| 211 | Text Area | subhooks for 150, 155 |
| 212 | Integer | subhooks for 150, 155 |
| 213 | URL | subhooks for 150, 155 |
| 215 | Boolean | subhooks for 150, 155 |
| 216 | Date | subhooks for 150, 155 |
| 220 | Select One | subhooks for 150, 155 |
| 230 | Select Multiple | subhooks for 150, 155 |
| 231 | Select Multiple (ordered) | subhooks for 150, 155 |
| 240 | Hidden Value | subhooks for 150, 155 |
| 160 | Delete Entity | A collection of Delete Instructions (hook_type 160) which can be executed to remove an entity described by one or more rows or columns in one or more table |
| 260 | Delete Instruction | subhooks for 160 |
| 171 | Image Upload & Insert | |
| 174 | Delete a File | |
| 180 | Edit Non-Displayed Entity | |
| 280 | Entity Column | subhooks for 180 |
| 190 | Custom Dialog | |

What is claimed is:

1. A method for editing web pages provided by a web server to clients having browser software, comprising:
providing a web page to clients that does not include editing logic such as buttons, toolbars and other actionable components of a web page editing system;
providing data that associates at least one portion of the web page not comprising the entire web page with data stored in at least one data store used by the web server to provide the web page;
selectively providing web page editing logic to clients;
at a client provided with the web page editing logic and the web page, using the browser software, user input, and the editing logic, displaying and editing the web page;
at a client provided with the web page and not having the web page editing logic, displaying the web page using the browser software; and
using the data that associates at least one portion of the web page not comprising the entire web page with data stored in the at least one data store, modifying the data stored in the at least one data store in accordance with the editing of the web page performed by the client provided with the editing logic.

2. The method of claim 1, wherein the web server provides the web page using data provided by at least one other server.

3. The method of claim 1, wherein the data stored in the at least one data store includes data executable by at least one of a client and the web server.

4. The method of claim 1, wherein selectively providing clients with editing logic comprises another server selectively providing the editing logic.

5. The method of claim 1, wherein modifying the data stored in the at least one data store comprises modifying the data with another server.

6. A method for editing web pages provided by a web server to clients having browser software, comprising:
   providing a web page to clients that does not include editing logic such as buttons, toolbars and other actionable components of a web page editing system;
   providing data that associates at least one portion of the web page not comprising the entire web page with data stored in at least one data store used by the web server to provide the web page;
   selectively providing web page editing logic to clients that is executed by the client's browser software;
   at a client provided with the web page editing logic and the web page, using the browser software, user input, and the editing logic, displaying and editing the web page;
   at a client provided with the web page and not having the web page editing logic, displaying the web page using the browser software; and
   using the data that associates at least one portion of the web page not comprising the entire web page with data stored in the at least one data store, modifying the data stored in the at least one data store in accordance with the editing of the web page performed by the client provided with the editing logic.

7. A method for editing web pages provided by a web server to clients having browser software, comprising:
   providing a web page to clients that does not include editing logic such as buttons, toolbars and other actionable components of a web page editing system;
   another server providing data that associates at least one portion of the web page not comprising the entire web page with data stored in at least one data store used by the web server to provide the web page;
   selectively providing web page editing logic to clients;
   at a client provided with the web page editing logic and the web page, using the browser software, user input, and the editing logic, displaying and editing the web page;
   at a client provided with the web page and not having the web page editing logic, displaying the web page using the browser software; and
   using the data that associates at least one portion of the web page not comprising the entire web page with data stored in the at least one data store, modifying the data stored in the at least one data store in accordance with the editing of the web page performed by the client provided with the editing logic.

8. The method of claim 7 wherein modifying the data stored in the at least one data store in accordance with the editing of the web page performed by the client provided with the editing logic is performed by a server other than the web server.

9. The method of claim 7 wherein selectively providing web page editing logic to clients is performed by a server other than the web server.

10. The method of claim 7 wherein the steps of modifying and providing web page editing logic are performed by one or more servers other than the web server.

11. The method of claim 7 wherein selectively providing web page editing logic to clients comprises executing the editing logic by the client's browser software.

12. A method for editing web pages provided by a web server to clients having browser software, comprising:
   providing a web page to clients that does not include editing logic such as buttons, toolbars and other actionable components of a web page editing system;
   providing data that associates at least one portion of the web page not comprising the entire web page with data stored in at least one data store used by the web server to provide the web page;
   selectively providing web page editing logic to clients;
   at a client provided with the web page editing logic and the web page, using the browser software, user input, and the editing logic, displaying and editing the web page;
   at a client provided with the web page and not having the web page editing logic, displaying the web page using the browser software; and
   using the data that associates at least one portion of the web page not comprising the entire web page with data stored in the at least one data store, modifying by a server other than the web server the data stored in the at least one data store in accordance with the editing of the web page performed by the client provided with the editing logic.

13. The method of claim 12 wherein selectively providing web page editing logic to clients comprises executing the editing logic by the client's browser software.

14. A method for editing web pages provided by a web server to clients having browser software, comprising:
   providing a web page to clients that does not include editing logic such as buttons, toolbars and other actionable components of a web page editing system;
   providing data that associates at least one portion of the web page not comprising the entire web page with data stored in at least one data store used by the web server to provide the web page;
   selectively providing web page editing logic to clients from a server other than the web server;
   at a client provided with the web page editing logic and the web page, using the browser software, user input, and the editing logic, displaying and editing the web page;
   at a client provided with the web page and not having the web page editing logic, displaying the web page using the browser software; and
   using the data that associates at least one portion of the web page not comprising the entire web page with data stored in the at least one data store, modifying the data stored in the at least one data store in accordance with the editing of the web page performed by the client provided with the editing logic.

15. The method of claim 14 wherein selectively providing web page editing logic to clients comprises executing the editing logic by the client's browser software.

16. The method of claim 1, 6, 7, 12, or 14 including the another server providing at least some of the data that associates at least one portion of the web page not comprising the entire web page with data stored in the at least one data store.

17. The method of claim 1, 6, 7, 12, or 14 including determining whether a client has authorization to edit the web page displayed by that client, and modifying the data stored in the data store only if the client has authorization to edit.

18. The method of claim 1, 6, 7, 12, or 14 wherein selectively providing the web page editing logic comprises providing the web page editing logic only to clients having authorization to edit the web page.

19. The method of claim 1, 6, 7, 12, or 14 wherein the data stored in the at least one data store includes data stored in one or more of the following: one or more files, one or more databases, one or more structured documents, and one or more volatile server memories.

20. The method of claim 19, wherein the web server provides the web page using data provided only by the web server.

21. The method of claim 1, 6, 7, 12, or 14 wherein providing the web page comprises at least one of accessing, processing and aggregating data from at least one data store.

22. The method of claim 1, 6, 7, 12, or 14 wherein providing the web page comprises providing a web page that includes data which describe or encapsulate content.

23. The method of claim 1, 6, 7, 12, or 14 wherein the associating data is provided in at least one of the web page or separately from the web page.

24. The method of claim 1, 6, 7, 12, or 14 wherein the associating data comprises at least one of logic and rules.

25. The method of claim 1, 6, 7, 12, or 14 comprising providing additional data relating to at least one of the web page, one or more data stores relating to the web page and rules relating to editing of the web page.

26. The method of claim 25, wherein the additional data is provided in at least one of the editing logic or associating data.

27. A method for editing web pages provided by a web server to clients having browser software, comprising:
    providing a web page to clients that does not include editing logic such as buttons, toolbars and other actionable components of a web page editing system;
    providing data that associates at least one portion of the web page not comprising the entire web page with data stored in at least one data store used by the web server to provide the web page;
    another server selectively providing web page editing logic to clients;
    at a client provided with the web page editing logic and the web page, using the browser software, user input, and editing logic, displaying and editing the web page;
    at a client provided with the web page and not having the web page editing logic, displaying the web page using the browser software; and
    the another server, using the data that associates at least one portion of the web page not comprising the entire web page with data stored in the at least one data store, modifying the data stored in the at least one data store in accordance with the editing of the web page performed by the client provided with the editing logic.

28. The method of claim 27 wherein selectively providing web page editing logic to clients comprises executing the editing logic by the client's browser software.

29. A method for editing web pages provided by a web server to clients having browser software, comprising:
    providing a web page to clients that does not include editing logic such as buttons, toolbars and other actionable components of a web page editing system;
    providing data that associates at least one portion of the web page not comprising the entire web page with data used by the web server to provide the web page;
    at a client having web page editing logic and the web page, using the browser software, user input, and the editing logic, displaying and editing the web page;
    at a client provided with the web page and not having the web page editing logic, displaying the web page using the browser software; and
    using the data that associates at least one portion of the web page not comprising the entire web page with data used by the web server, modifying the data used by the web server in accordance with the editing of the web page performed by the client having editing logic.

30. A method for editing structured documents provided by a server to clients having viewing software for displaying the structured documents, comprising:
    providing a structured document to clients that does not include editing logic such as buttons, toolbars and other actionable components of a web page editing system;
    providing data that associates at least one portion of the structured document not comprising the entire structured document with data used by the server to provide the structured document;
    at a client having structured document editing logic and the structured document, using the viewing software, user input, and editing logic, displaying and editing the structured document;
    at a client provided with the structured document and not having the structured document editing logic, displaying the structured document using the viewing software; and
    using the data that associates at least one portion of the structured document not comprising the entire structured document with data used by the server, modifying the data used by the server in accordance with the editing of the structured document performed by the client having editing logic.

31. A system for editing structured documents in a client/server computer system, compnsing:
    means for providing the structured documents to clients that does not include editing logic such as buttons, toolbars and other actionable components of a web page editing system;
    means for displaying the structured documents by the clients;
    means for storing data used to provide the structured documents;
    means for associating at least one portion of the structured documents not comprising the entire structured documents with data used to provide the structured documents;
    means for displaying and editing the structured document at a client provided with the structured document editing logic and the structured document, using the viewing software, user input, and the editing logic;
    means for displaying the structured document at a client provided with the structured document and not having the structured document editing logic, using the viewing software; and means for modifying the data used to provide the structured documents in accordance with the editing of the structured documents.

32. A method for editing web pages provided by a web server to clients having browser software, comprising:
providing a web page to clients that does not include editing logic such as buttons, toolbars and other actionable components of a web page editing system;
providing data that associates at least one portion of the web page not comprising the entire web page with data stored in at least one of one or more files comprising logic processed by the server, one or more non-file data stores, and more than one file used by the web server to provide the web page;
selectively providing web page editing logic to clients;
at a client provided with the web page editing logic and the web page, using the browser software, user input, and the editing logic, displaying and editing the web page;
at a client provided with the web page and not having the web page editing logic, displaying the web page using the browser software; and
using the data that associates at least one portion of the web page not comprising the entire web page with stored data, modifying the stored data in accordance with the editing of the web page performed by the client provided with the editing logic.

33. A method for editing web pages provided by a web server to clients having browser software, comprising:
providing a web page to clients that does not include editing logic such as buttons, toolbars and other actionable components of a web page editing system whose complete content is not stored as a complete file used to provide the web page;
providing data that associates at least one portion of the web page not comprising the entire web page with data stored in at least one data store used to provide the web page;
selectively providing web page editing logic to clients;
at a client provided with the web page editing logic and the web page, using the browser software, user input, and the editing logic, displaying and editing the web page;
at a client provided with the web page and not having the web page editing logic, displaying the web page using the browser software; and
using the data that associates at least one portion of the web page not comprising the entire web page with data stored in the at least one data store, modifying the data stored in the at least one data store in accordance with the editing of the web page performed by the client provided with the editing logic.

34. A method for editing web pages provided by a web server to clients having browser software, comprising:
providing a web page to clients that does not include editing logic such as buttons, toolbars and other actionable components of a web page editing system and that does not comprise data added for the purpose of encapsulating or describing editable data within the web page;
providing data that associates at least one portion of the web page not comprising the entire web page with data stored in at least one data store used by the web server to provide the web page;
selectively providing web page editing logic to clients;
at a client provided with the web page editing logic and the web page, using the browser software, user input, and the editing logic, displaying and editing the web page;
at a client provided with the web page and not having the web page editing logic, displaying the web page using the browser software; and
using the data that associates at least one portion of the web page not comprising the entire web page with data stored in the at least one data store, modifying the data stored in the at least one data store in accordance with the editing of the web page performed by the client provided with the editing logic.

* * * * *